United States Patent [19]

Fulmer

[11] Patent Number: 4,519,295
[45] Date of Patent: May 28, 1985

[54] VACUUM BRAKE BOOSTERS

[75] Inventor: Keith H. Fulmer, South Bend, Ind.

[73] Assignee: Allied Corporation, Morristown, N.J.

[21] Appl. No.: 500,517

[22] Filed: Jun. 2, 1983

[51] Int. Cl.³ .................. F15B 9/10; B60T 13/48; F01B 11/02

[52] U.S. Cl. .................. 91/376 R; 92/169; 60/547.1

[58] Field of Search .............. 92/169.1, 169.2, 169.3, 92/1, 98 R, 98 D; 220/437, 439, 71; 91/376 R; 60/547.1

[56] References Cited

U.S. PATENT DOCUMENTS

| 4,286,501 | 9/1981 | Thomas et al. | 92/169.3 |
| 4,398,449 | 8/1983 | Takayama et al. | 92/169.3 |
| 4,402,256 | 9/1983 | Ando | 92/169.3 |

FOREIGN PATENT DOCUMENTS

| 2044375 | 10/1980 | United Kingdom | 92/169.2 |
| 2087495 | 5/1982 | United Kingdom | 92/169.2 |
| 2093136 | 8/1982 | United Kingdom | 92/169.3 |

Primary Examiner—Robert E. Garrett
Assistant Examiner—H. Edward Li
Attorney, Agent, or Firm—Leo H. McCormick, Jr.; Ken C. Decker

[57] ABSTRACT

A power assist apparatus (18) having a first shell (32) connected to a second shell (34) by a twist lock arrangement (41). The shells (32) and (34) are made of a light weight and flexible material such that when subjected to temperatures above 120° F. the pressure differential created by vacuum on the inside of the shells (32 & 34) and atmospheric pressure on the outside of the shells (32 & 34) a crushing force is produced that urges the end (33) of the shell (32) toward shell (34). A plurality of struts (98) located between the shells (32 & 34) resists this crushing force to maintain the minimum spacial relationship between shells (32 & 34).

11 Claims, 2 Drawing Figures

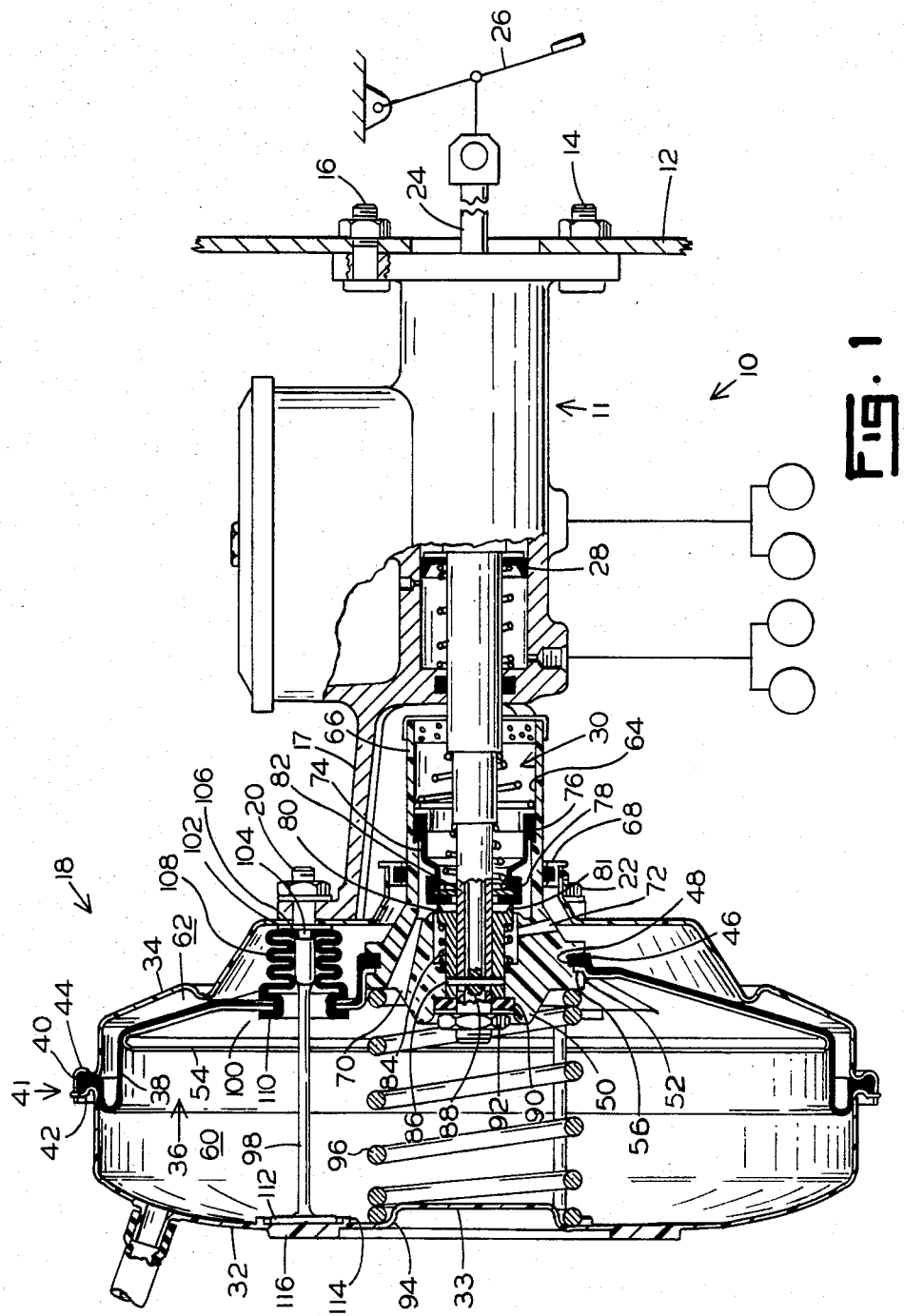

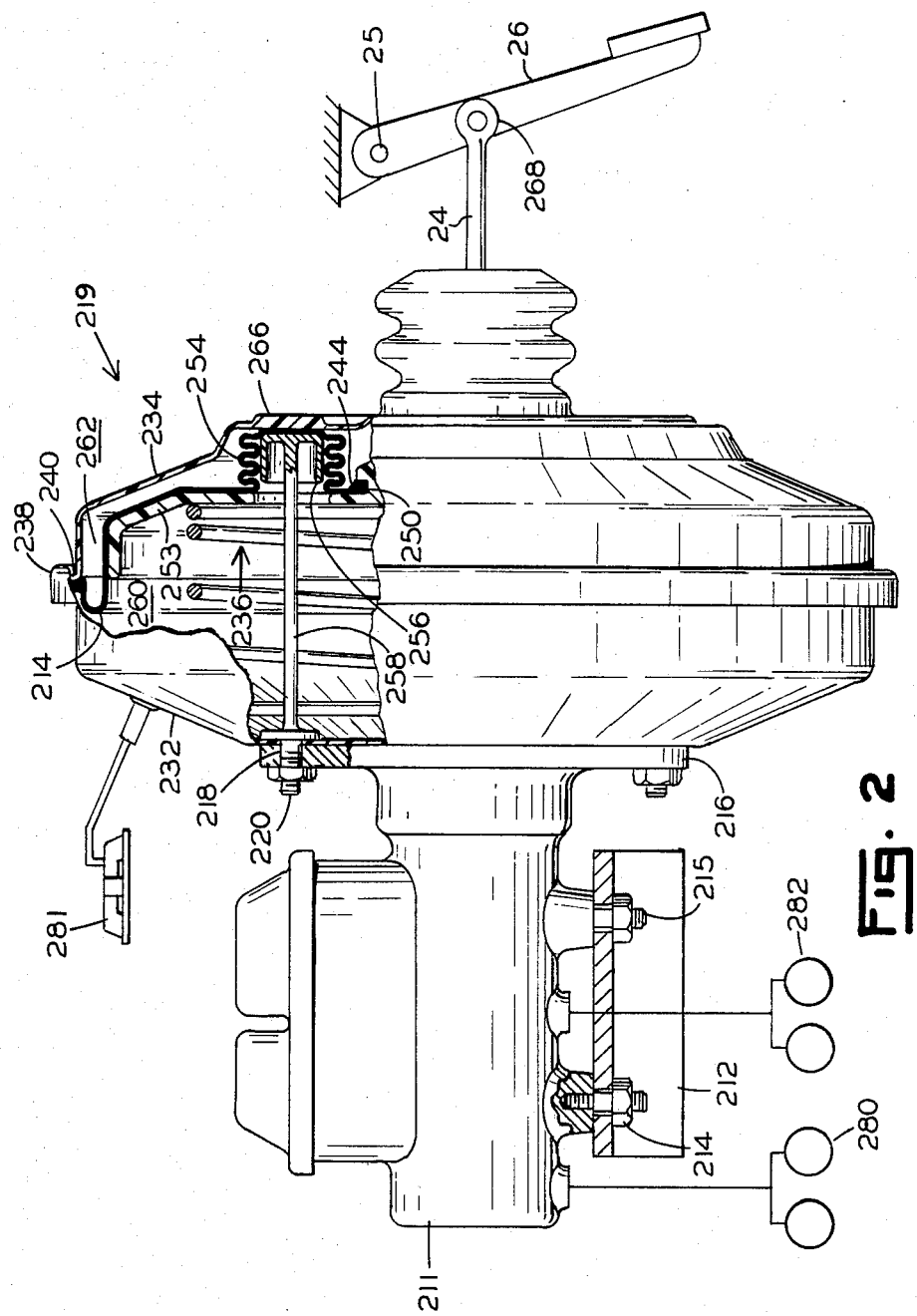

VACUUM BRAKE BOOSTERS

BACKGROUND OF THE INVENTION

This invention relates to a housing for a power assist apparatus having internal strut members to maintain the space relationship between a front shell and a rear shell. The struts assure that a movable wall of the power assist apparatus can move a fixed distance from a rest position to a maximum actuating position without engaging the front shell.

In order to reduce distortion that can occur when reactionary forces are transferred through the housing of a power assist apparatus, it has been disclosed in U.S. Pat. No. 4,270,353 to provide force transmitting members that extends from a master cylinder into a stationary mounting. This housing no longer is required to carry reaction forces, therefore the material that the housing is made of can be changed from a metal to a plastic. In addition, the gauge of the material can also be reduced. Unfortunately with light weight material it is possible to distort the housing and especially when the apparatus is in the rest condition. In the rest condition, the interior of the apparatus is connected to a source of vacuum while the exterior of the housing is subjected to atmospheric pressure resulting in a pressure differential being created across the housing. As long as the temperature of the housing remains below 120° F. the housing retains its shape. Unfortunately, when the temperature increases above 120° F. as often occurs when power assist apparatus are located in vehicles, the plasticity of the housing material allows the pressure differential to create a crushing force that attempts to move the end shells toward each other. Any increase in the thickness of the housing material to resist the crushing force substantially increases the weight of the power assist apparatus.

In an effort to further reduce the weight of a power assist apparatus it has been disclosed in U.S. Pat. application No. 437,940 filed Nov. 1, 1982 to mount a master cylinder on the stationary fire wall and have the power assist apparatus pull the pistons in the master cylinder. This structure should weigh less than the power assist apparatus disclosed in U.S. Pat. No. 4,270,353 since the force transmitting means has been eliminated. Unfortunately as with the housings disclosed in both U.S. Pat. No. 4,270,353 and U.S. Application No. 437,940, the shells are made of a light weight and thin gauge steel or plastic which when subjected to high temperature and a pressure differential created between the atmosphere and vacuum in the housing, can distort.

SUMMARY OF THE INVENTION

The housing of the power assist apparatus in the brake system disclosed in this invention has light weight and thin gauge front and rear shells which are held in a substantially fixed spaced relationship by struts located between the front and rear shells. A reinforcing ring integrally molded in the front shell has a plurality of annular rib. Each rib receives the end of a corresponding strut. The reinforcing ring uniformly distributes a static force developed by the resistance to movement of the front and rear shells by the pressure differential created by atmospheric pressure on one side of the shells and vacuum in chambers within the housing. Each strut extends through the movable wall of the power assist apparatus. A plurality of bellows type seals are connected to the movable wall and struts to assure that the operational chamber and vacuum chamber remain separated from each other. During the operation of the power assist apparatus, the operational pressure differential acts on and moves the movable wall toward the front shell. Since the struts maintain the spaced relationships between the front and rear shells, the wall is free to move to its maximum actuation position. All the reaction forces are carried through the front shell to the stationary support member by way of the rear shell. Even though the front shell may move away from the strut such deflection is not detrimental since the master cylinder is fixed to the stationary support. On termination of the operation of the power assist apparatus, the pressure differential between air or atmospheric pressure on the outside of the shells and vacuum on the inside of the shells moves the front shell back into engagement with the strut. Should the temperature of the atmosphere in which the power assist apparatus is located be such that the front and rear shells become plastic, the struts maintain the minimum preset space relationship between the front and rear shells.

An advantageous effect of this invention occurs through the use of struts located between the front and rear shells which maintains a set space relationship therebetween to permit the use of light weight and thin shells.

Another advantage of this invention occurs through the fixing of a master cylinder to a stationary firewall and the cantilever attachment of a power assist housing thereto. The front shell of the power assist housing is free to deflect away from the rear shell while a plurality of strut members located in the power assist housing limit the movement of the front shell toward the rear shell thus assuring that the movable wall within the power assist housing can achieve a maximum stroke when placed in an environment in which the temperature is above 120° F.

It is therefore an object of this invention to provide a power assist apparatus having first and second thin shells with internal struts to prevent the shells from collapsing when subjected to a pressure differential created by atmospheric pressure on the outside of the shells and vacuum on the interior of the shells.

These and other objects and advantages should be apparent from reading this specification while viewing the drawing.

BRIEF DESCRIPTION OF THE DRAWINGS

FIG. 1 is a schematic illustration of a brake system with a sectional view of a power assist apparatus made according to the principles of this invention, which is attached to a master cylinder fixed to a fire wall of a vehicle; and FIG. 2 is another embodiment of this invention wherein the master cylinder is fixed to the spring tower of the vehicle.

DETAILED DESCRIPTION OF THE INVENTION

The brake system 10 shown in FIG. 1 has a master cylinder 11 which is fixed to fire wall 12 by bolts 14 and 16 and to a power assist apparatus 18 by bolts 20 and 22.

Master cylinder 11 is of the type disclosed in U.S. patent application No. 437,940 wherein the push rod 24 from the brake pedal 26 passes through the pistons 28 (only one is shown) to provide valve 30 with an input when an operator desires to effect a brake application.

The power assist apparatus 18 has a housing formed by connecting a front shell 32 and a rear shell 34. The material of which the shells 32 and 34 is made can be light weight and thin gauge aluminium, steel, or a plastic, all of which are acceptable. A movable wall 36 which divides the interior of the housing into a first chamber 60 and a second chamber 62 has a diaphragm 38 and a backing plate 54. The diaphragm 38 has a first bead 40 located between shoulders 42 and 44 on the first and second shells 32 and 34, respectively, and a second bead 46 that snaps into a groove 48 on a hub member 50. The second bead 46 holds lip 52 on backing plate 54 against a shoulder 56 to separate the first chamber 60 from the second chamber 62.

The hub 50 has a projection 66 that extends through opening 68 in shell 34. A bore 64 in projection 66 which retains valve 30 has a first passage 70 connected to chamber 60 and a second passage 72 connected to chamber 62.

Valve 30 has a poppet member 74 which a first end 76 attached to projection 66 and a second end 79 free to move within the bore 64 and a cylindrical member 80. The cylindrical member 80 which is concentric to pull tube 82 attached to piston 28 is urged toward the free end 78 of poppet member 74 by return spring 84. A pin 86 extends through slot 88 in pull tube 82 to connect cylindrical member 80 with push rod 24.

A reaction disc 90 which surrounds pull tube 82 is retained in hub 50 by an adjustable nut 92 that is threadably connected to the end of tube 82.

A return spring 96 which is located between annular guide 94 and hub 50 urges wall 36 toward shell 34.

A plurality of strut members 98 (only one is shown) extend from each mounting bolt 20 through an opening 100 through the movable wall 36 toward the first shell 32. A shoulder 102 on strut 98 abuts shell 34 and forms a head for mounting bolt 20. In addition, a groove 104 adjacent shoulder 102 forms a seat for bead 106 a bellows type seal 108. A second bead 110 on seal 108 engages the diaphragm 38 and backing plate 54 surrounding opening 100 to effectively seal chamber 60 from chamber 62.

Each strut 98 has a head 112 on the end thereof that is located adjacent an annular rib 114 on the first shell 32. An annular reinforcing ring 116 (which in the case of the shell 32 being constructed of plastic is integrally molded therein or a separate part in the event that aluminium or steel is used) uniformly distributes forces to the shell 32. The shell 32 transfers the reaction forces through twist lock connection 41 into shell 34 and flange 17 of master cylinder 11.

Under maximum operating conditions, shell 32 deflects from its normal spatial distance from shell 34. However, such deflection has no substantial effect on the output of the master cylinder 11 since fasteners 14 and 16 hold the master cylinder 11 stationary against wall 2.

When the under hood operating conditions exceed 120° F., the material of which the shells 32 and 34 are made can become plastic and tend to deflect to a greater extent.

When the input force applied to push rod 24 to initiate the actuation of valve 30 terminates, spring 84 moves atmospheric seat 81 on cylindrical member 80 into engagement with end 78 of poppet 74 to interrupt the communication of air into chamber 62 by way of passage 72. Further movement of cylindrical member allows vacuum present in chamber 60 to evacuate air from chamber 62 and eliminate the pressure differential across wall 36. As this pressure differential is reduced, return spring 96 moves wall 36 toward shell 34 and eventually to the rest position shown in FIG. 1.

Under some circumstances the combination of temperature and the pressure differential created between the vacuum in chambers 60 and 62 and air at atmospheric pressure is such that shell 32 deflects toward shell 34. However, face or head 112 engages rib 116 to limit movement of the shell 32 toward shell 34 to a specific fixed spatial distance. Since strut 98 only sees compression forces it is designed to be of such size to not substantially increase the weight of the power assist apparatus 18. It is envisioned that the strut 98 could be made of plastic and yet perform the function of maintaining the shells 32 and 34 at the minimum spaced relationship. When the under hood temperature decreases, the plasticity of the material decreases and as the temperature is reduced to below 120° F. the material returns to a substantially rigid structure. Thus, the movable wall 36 is provided with the capability of moving a maximum distance toward shell 32 without being hampered by the engagement of hub 50 on a deflected rib 94.

In a secondary embodiment shown in FIG. 2, wherein like parts are used, the same reference numeral is also used.

In this embodiment, master cylinder 211 is fixed to the spring tower support 212 by fasteners or bolts 214 and 215. The flange 216 of master cylinder 211 has opening 218 through which bolts 220 extend to attach housing 232 of the power assist apparatus 219. Shell 232 is connected to shell 234 by a twist lock arrangement 238 to form a sealed cavity.

The sealed cavity is divided into chambers 260 and 262 by movable wall 236. One bead 240 of diaphragm 214 forms part of the twist lock arrangement 218 and another bead 244 snaps into a groove in hub 250 adjacent integral backing plate 253. A bellows type projection 254 extends from diaphragm 214 toward shell 234. Head 256 on strut 258 engages the bottom of projection 254 to hold the bellows against shell 234. Strut 258 can be designed to be part of the mounting bolt 220 or a separate part attached thereto. Shell 234 has a reinforcing ring 266 attached thereto or integral therewith.

A control valve in hub 250 controls the flow of fluid communication between chambers 260 and 262.

Brake pedal 26 which is connected to pivot pin 25 is the only fixed connection between master cylinder 211 and tower support 212. When push rod 24 extends through fire wall 12 to provide the control valve with an input a semi circular ball and eye 268 have sufficient movement to assure that the plunger thereof moves without binding.

During the operation of the vehicle, vacuum produced at the intake manifold 281 is communicated to chamber 260. This vacuum evacuates air from chambers 260 and 262 to vacuum suspend movable wall 236. With vacuum in chambers 260 and 262 and air on the outside of shells 232 and 234 a pressure differential is created that acts on the shell to attempt to move the shells 232 and 234 toward each other. As the temperature under the hood of the vehicle increases, the material of which the shells 232 and 234 are made of tend to exhibit plastic characteristics. At some temperature, the force created by the pressure differential is sufficient to move the shells 232 and 234 toward each other. At this point in time struts 258 resist movement of shells 232 and 234 to assure that a minimum spacial relationship is maintained. Thus, the maximum operational movement for wall 236 is maintained thereby assuring that master cylinder 211 and power assist booster 219 have the capability of providing wheel brakes 280 and 282 with a maximum operational fluid pressure in response to an input from pedal 26.

I claim:

1. In a brake system having a housing formed by connecting a first shell to a second shell, a wall located between said first and second shells to define first and second chambers within said housing, said first and second chambers being connected to a first source of fluid, a valve responsive to an input signal for sequentially interrupting communication of said first fluid to said second chamber and initiating communication of a second source of fluid to said second chamber to create a pressure differential across said wall, said pressure differential moving said wall from a rest position to an actuation position corresponding to said input signal, said first shell being free to deflect in response to a movement of said wall, the improvement comprising:

a plurality of strut members located between said first and second shells to maintain a substantially fixed space relationship therebetween, each of said strut members being of sufficient length such that said wall can achieve its maximum actuation position without engaging said first shell.

2. In the brake system as recited in claim 1 wherein said first shell includes:

an annular rib having a plurality of grooves for receiving a corresponding first end of a strut member, said rib uniformly distributing any closure forces created by the atmosphere acting on said first and second shells through the strut members into said first shell.

3. In the brake system as recited in claim 2 wherein said strut members extend through said wall and seal means which are attached to said wall, said seal means surrounding said strut members to prevent fluid communication between said first and second chambers.

4. In the brake system as recited in claim 3 wherein said seal means is located between a shoulder on each of said struts adjacent said second shell and said wall, said strut having a second end that is fixed with respect to said second shell.

5. In a power assist apparatus having a housing formed by connecting a first shell to a second shell to define a cavity therein, said cavity being connected to a source of vacuum to suspend a movable wall located in said cavity, said housing being subjected to a closure force developed by a pressure differential created by the vacuum in said cavity and the air surrounding said housing, said housing being connected to a substantially stationary member by fastener members, the improvement wherein strut means have a first end secured to said first shell and a second end that extend through said cavity to a fixed position adjacent said second shell to oppose said closure force and thereby maintain a minimum internal space relationship between said first and second shell.

6. In the power assist apparatus as recited in claim 5 wherein said wall is characterized by a bellows that surrounds said strut means to seal the first and second chambers from each other.

7. In the power assist apparatus, as recited in claim 6 characterized in that an annular rib in contact with said second shell engages said strut means to uniformly distribute said closure force to said second shell.

8. In the power assist apparatus as recited in claim 7 wherein said fastener is characterized by stationary bolts which support said power assist apparatus, said bolts being integral with said strut means.

9. In the power assist apparatus as recited in claim 6 wherein said second shell includes grooves for aligning said strut means in said cavity.

10. In the power assist apparatus as recited in claim 6 characterized in that said strut means includes a plurality of members which extend from said bolts, each of said members being of such length that said wall has the capability of moving its maximum distance without engaging said first shell.

11. In a system having a housing formed by connecting a first shell to a second shell, a wall located between said first and second shells to define first and second chambers within said housing, said first and second chambers being connected to a first source of fluid, a valve connected to said second chamber and responsive to an input signal for interrupting communication of said first source of fluid thereto and the initiation of a second source of fluid thereto to produce a pressure differential across said wall, said pressure differential moving said wall from a rest position to an actuation position corresponding to said input signal, the improvement comprising:

a plurality of strut members extending between said first and second shells with a fixed end and a free end to maintain a minimum internal spaced relationship therebetween with communication of said first fluid to said first and second chambers to assure that said wall can achieve its maximum actuation position corresponding to said pressure differential even though one of said first and second shells can freely move away from the other shell as said wall moves to said maximum actuation position.

* * * * *